United States Patent
Meiri et al.

(10) Patent No.: US 10,374,792 B1
(45) Date of Patent: Aug. 6, 2019

(54) LAYOUT-INDEPENDENT CRYPTOGRAPHIC STAMP OF A DISTRIBUTED DATASET

(71) Applicant: EMC IP Holding Company, LLC, Hopkinton, MA (US)

(72) Inventors: David Meiri, Cambridge, MA (US); Xiangping Chen, Sherborn, MA (US); William R. Stronge, Westford, MA (US); Felix Shvaiger, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 221 days.

(21) Appl. No.: 15/280,620

(22) Filed: Sep. 29, 2016

(51) Int. Cl.
  *H04L 9/06* (2006.01)
  *H04L 9/32* (2006.01)
  *G06F 12/12* (2016.01)
  *G06F 12/121* (2016.01)

(52) U.S. Cl.
  CPC ............ *H04L 9/0643* (2013.01); *G06F 12/12* (2013.01); *G06F 12/121* (2013.01); *H04L 9/3297* (2013.01)

(58) Field of Classification Search
  CPC . G06F 2212/69; G06F 12/121; H04L 9/0643; H04L 9/3297
  USPC .......................................................... 380/28
  See application file for complete search history.

(56) References Cited

U.S. PATENT DOCUMENTS

| | | | |
|---|---|---|---|
| 5,717,919 A * | 2/1998 | Kodavalla | G06F 17/30339 |
| 8,397,066 B2 * | 3/2013 | Krishnamoorthy | G06F 21/6218 713/165 |
| 9,384,227 B1 * | 7/2016 | Xiao | G06F 17/30584 |
| 2003/0212893 A1 * | 11/2003 | Hind | H04L 9/3236 713/177 |
| 2010/0077468 A1 * | 3/2010 | Pragides | G06F 17/30572 726/7 |
| 2015/0106420 A1 * | 4/2015 | Warfield | H04L 41/5041 709/201 |
| 2016/0116893 A1 * | 4/2016 | Justin | G05B 11/01 700/79 |
| 2016/0284033 A1 * | 9/2016 | Winand | G06Q 50/06 |

* cited by examiner

*Primary Examiner* — Ali S Abyaneh
*Assistant Examiner* — Zoha Piyadehghibi Tafaghodi
(74) *Attorney, Agent, or Firm* — Krishnendu Gupta; Lesley Leonessa

(57) ABSTRACT

A system, computer program product, and computer-executable method of providing a layout-independent cryptographic stamp of a distributed data set from a data storage system, the system, computer program product, and computer-executable method comprising receiving a request for a cryptographic stamp of the distributed data set, creating a hash of each slice of the distributed data set, and using each hash from each slice of the distribute data set to create the cryptographic stamp of the distributed data set.

18 Claims, 10 Drawing Sheets

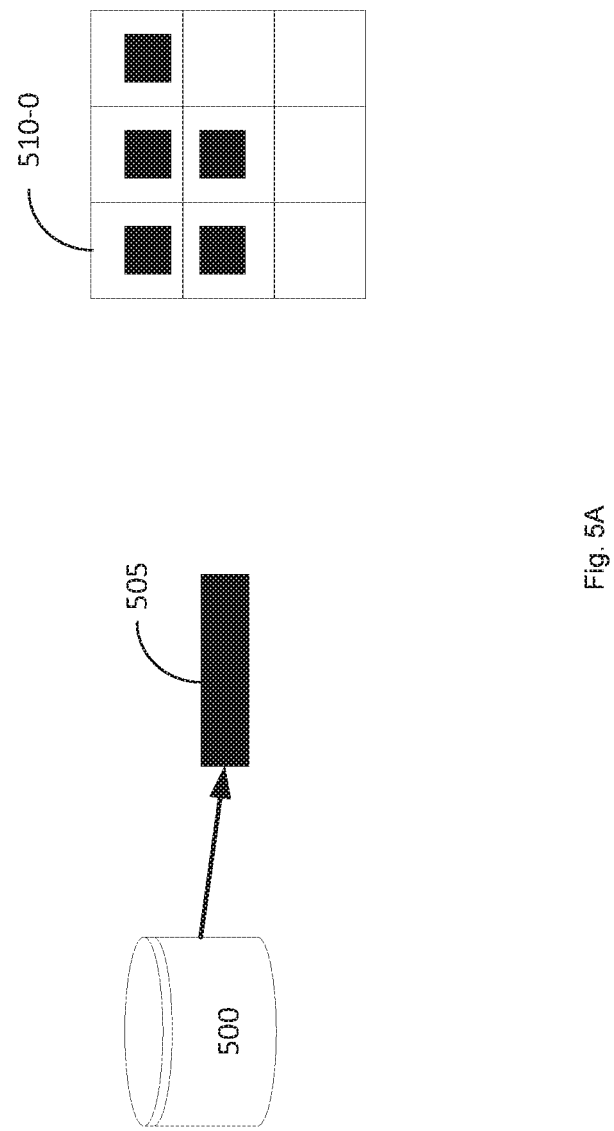

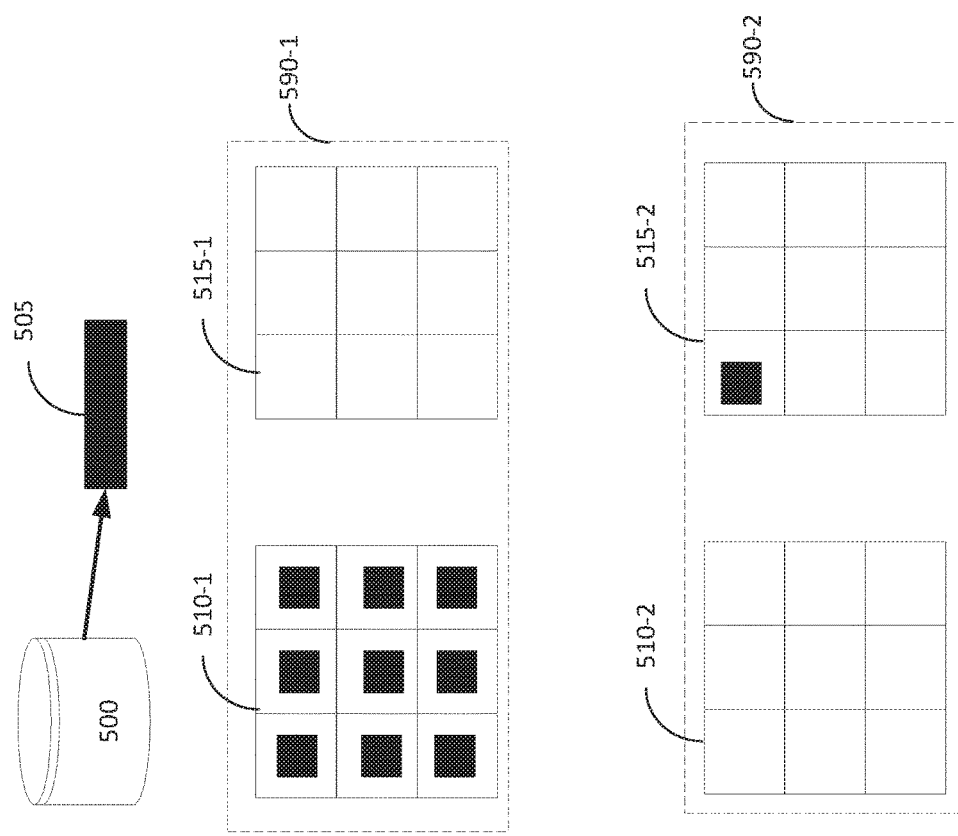

LAYOUT-INDEPENDENT CRYPTOGRAPHIC STAMP OF A DISTRIBUTED DATASET

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of providing a layout-independent cryptographic stamp of a distributed data set from a data storage system, the system, computer program product, and computer-executable method comprising receiving a request for a cryptographic stamp of the distributed data set, creating a hash of each slice of the distributed data set, and using each hash from each slice of the distribute data set to create the cryptographic stamp of the distributed data set.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 5A-5C show simplified state diagrams of a thread in a control module within a data storage system processing a slice of a distributed dataset, in accordance with an embodiment of the present disclosure;

Like reference symbols in the various drawings indicate like elements.

DETAILED DESCRIPTION

Figure 1:
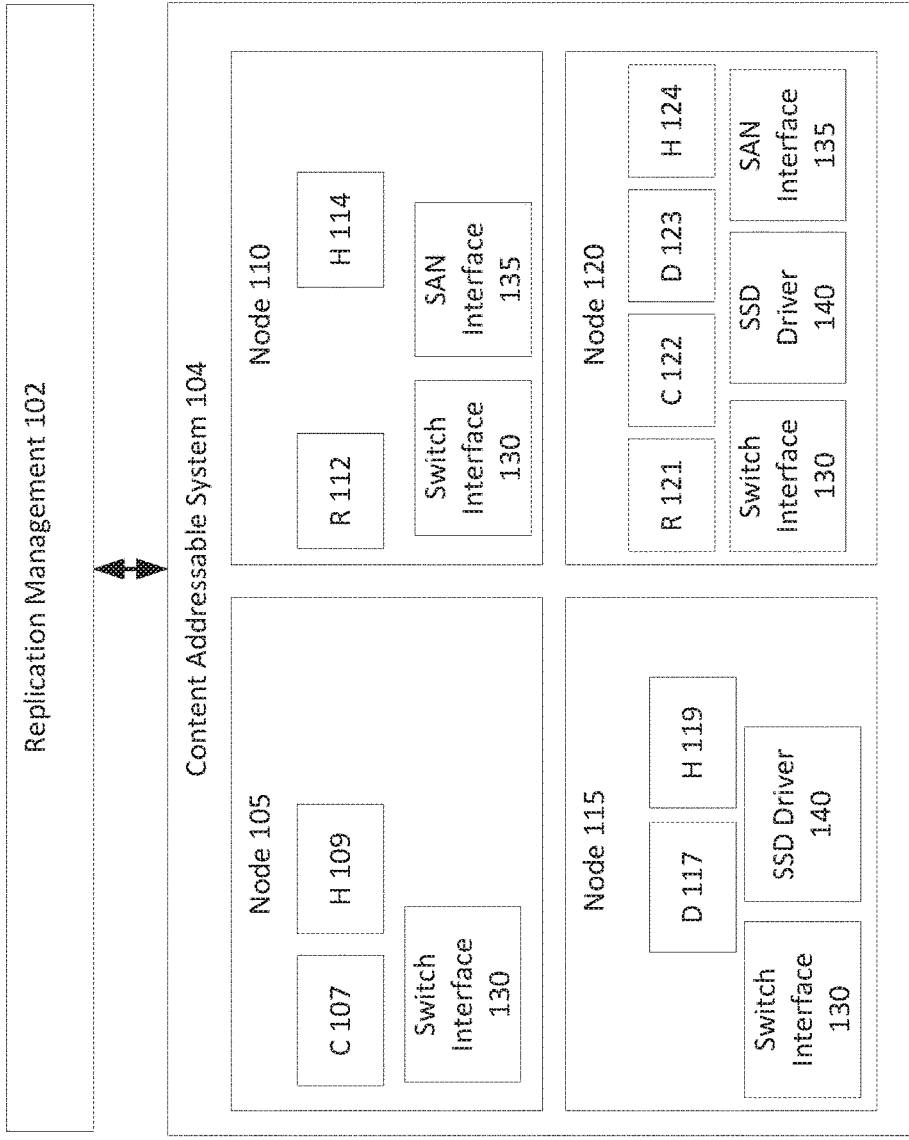
FIG. 1 is a simplified illustration of a data storage system including a content addressable system (cluster), in accordance with an embodiment of the present disclosure.

Traditionally, data storage system are becoming distributed where data and meta-data is distributed across multiple nodes. Typically, each node owns a slice of the data or meta-data. Generally, data ownership can be split according to volumes, volume address-space, data hash signature, or various other criteria. Traditionally, data storage systems create unique cryptographic stamps to identify an object. However, generally, creating cryptograph stamps has been complicated and processor intensive. Conventionally, it would be beneficial to the data storage industry to be able to efficiently create a cryptographic stamp.

In many embodiments, the current disclosure may enable a data storage system to create a layout-independent cryptographic stamp of data stored within a data storage system. In various embodiments, the current disclosure may enable a data storage system to identify a portion of data regardless of where the portion of data is stored. In certain embodiments, efficiently calculating a globally unique cryptographic stamp (and/or hash signature) of a distributed object may be desirable. In most embodiments, the stamp may be used to later identify an object in another storage array.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

Further information about Hash-Based Replication may be found in U.S. Pat. No. 9,378,106 issued on Jun. 28, 2016, assigned to EMC Corporation of Hopkinton, Mass. and is hereby incorporated by reference in its entirety.

Layout-Independent Cryptographic Stamp of a Distributed Dataset

In many embodiments, the current disclosure may enable a data storage system to create layout-out independent cryptographic stamps (and/or hash signatures) of a distributed dataset. In various embodiments, large distributed objects may have different layouts in other arrays. In some embodiments, for example, another array may split an object on a different number of nodes, or may use different rules for distributing the data. In other embodiments, the current disclosure may enable a data storage system to calculate such layout-independent cryptographic stamp of a distributed data set given certain constants between data storage systems. In various embodiments, the current disclosure may be enabled to efficiently calculate such a stamp that may be layout independent assuming that the two data storage systems (and/or data storage arrays) share some basic architecture. In some embodiments, basic architecture may include, but is not limited to, page size.

Traditionally, creating a cryptographic stamp can be a difficult and/or time intensive task. Typically, there are two issues. Generally, a first issue of ignoring layout issues creates a stamp that is only valid inside the data storage array that created the stamp creating a layout dependent stamp. Conventionally, a layout dependent stamp is insufficient for replication and/or data migration uses cases, where object verification (such as a volume, snapshot, and/or delta set) needs to be performed on an object transferred to from a source site to a target site. Traditionally, a second issue involves taking into account various layouts between various data storage arrays. Typically, when creating a stamp, data storage arrays attempt to organize an object in a logical order (serialization) and computing the stamp following that order, which solves the layout problem. However, generally, that process requires that the computation to be done by a single processor that needs to receive all the data and then compute the stamp. Conventionally, the second issue results in a highly inefficient solution.

In many embodiments, the current disclosure may enable a data storage array, data storage system, and/or cluster to efficiently create a layout-independent cryptographic stamp of one or more objects within a distributed data set. In various embodiments, an object may include, but is not limited to, a volume of data, volume of meta-data, snapshot, and/or a delta set between two points in time. In some embodiments, data storage system, data storage array, and/or cluster may be interchangeable. In certain embodiments, the current disclosure may be enabled two or more data storage system, operating under a few assumptions, to calculate the exact same cryptographic stamp in a distributed fashion given the same object, even when the object may be ordered with a different layout within each data storage system. In some embodiments, assumptions may include common page size and/or common sub-lun granularity.

In most embodiments, the current disclosure may be enabled to create and/or calculate a stamp from volume raw data (i.e., data pages). In various embodiments, the current disclosure may be enabled to create and/or calculate a stamp from hash signatures. In certain embodiments, the current disclosure may be enabled to create and/or calculate a stamp from in-memory short hashes. In most embodiments, to operate on an object (i.e., full volumes, snapshot, delta-set) each of these cases may be required to compute the stamp based on raw data, a full hash signature, a short hash, and/or any other combination of data and meta-data that may be stored in a distributed fashion. In most embodiments, one or more assumptions may be made of data layout. In some embodiments, assumptions may include page size, granularity of dividing volumes, and/or slices per object. In certain embodiments, a data storage system may assume that each system uses the same page size, divides each volume using the same granularity, uses the same number of slices, and/or may divide slices across modules in various different fashions. In most embodiments, a slice may be a portion of data which may be distributed throughout a data storage system. In certain embodiments, a data storage system may divide data among its nodes using a set number of slices of the data.

Refer to the example embodiment of FIG. 1. FIG. 1 is a simplified illustration of a data storage system including a content addressable system (cluster), in accordance with an embodiment of the present disclosure. Data storage system 100 includes replication management 102, content addressable storage (CAS) system 104. In many embodiments, data storage system 100 may be enabled to manage multipole CAS systems. CAS 104 has been expanded to show a possible implementation. CAS system 104 includes nodes 105, 110, 115, 120. Node 105 includes a control module 107, hash module 109, and a switch interface 130. Node 110 includes a routing module 112, hash module 114, switch interface 130, and SAN interface 135. Node 115 includes a data module 117, a hash module 119, switch interface 130, and SSD Driver 140. Node 120 includes a routing module 121, a control module 122, a data module 123, a hash module 124, a switch interface 130, ssd driver 140, and SAN interface 135. Nodes 105, 110, 115, 120 are enabled to use switch interfaces 130 on each respective node to communicate with other nodes within CAS 104. CAS 104 uses SSD Driver 140 to communicate with data storage managed by CAS 104. CAS 104 uses SAN interface 135 to communicate with other clusters within data storage system 100 and replication management 102. In some embodiments, each node 105, 110, 115, 120 may be enabled to use switch interface to communicate with replication management 102 and/or other clusters within data storage system 100. Other clusters within data storage system 100 can be implemented in a similar manner; however the distribution of control modules, hash modules, routing modules, and data modules may differ. In some embodiments, each node within a cluster may include one of each type of module. Replication management 102 is in communication with CAS 104. Replication management 102 is enabled to provide commands to CAS 104. Replication management 102 is enabled to direct either CAS 104 to replicate to a target site.

In many embodiments, within distributed data storage system as described above assumptions may be made to facilitate creation of a layout-independent cryptographic stamp and/or hash. For example, in various embodiments, short hashes may be indexed by Logical Address (LXA) and may distributed across multiple control modules in the following fashion:

(a) Given an LXA, its slice number is computed by looking at bits 8-17 (counting from lsb)

(b) Given a slice, its C module owner is computed using a A2C table, that translates a slice number 0-1023 to a reference to a C module (c) A2C tables are not assumed to be identical in different systems In most embodiments, a data storage system may include a replication management module and at least one cluster. In various embodiments, a replication management module may receive a command to calculate a cryptographic stamp for a static volume V. In most embodiments, cryptographic stamp. In certain embodiments, a replication management module may allocate an array of entries (i.e. 1024) where each entry may be large enough to contain one stamp. In some embodiments, a replication management module may request that each Control module within a cluster to calculate a stamp for each of its slices and send the stamp to the replication management module when done. In most embodiments, calculation of each layout-independent cryptographic stamp may be performed in a distributed fashion in parallel, independently of other control modules. In various embodiments, once a replication management module receives each of the results (i.e., 1024 results), the replication management module may calculate one more cryptographic stamp of the allocated array of entries of results received. In some embodiments, a data storage system may use a SHA1 hash algorithm to create a cryptographic stamp. In other embodiments, a data storage system may use other known hash algorithms to create a cryptographic stamp. In most embodiments, the hash of the array of entries on the replication management module may be defined as a cryptographic stamp of the dataset.

In many embodiments, Control modules within a cluster may be enabled to create and/or calculate a cryptographic stamp for each of the N slices of data the control module manages, where N may be the number of slices managed by each respective control module. In various embodiments, upon receiving a request to create a cryptographic stamp for each slice of data, the control module may spawn N threads. In certain embodiments, a control module may task each thread with calculating a cryptographic stamp of one of the slices managed by the control module. In most embodiments, when each thread has completed processing, a control module may send N cryptographic stamps back to the replication management module, where N represents the N slices managed by the control module.

In most embodiments, a thread processing within a control module may be given a single slice of a distributed data set. In various embodiments, the thread's goal may be to calculate a layout independent stamp of the provided slice of data. In most embodiments, a thread and/or a control module may create one or more data pages as a work buffer to process one or more slices to create a cryptographic stamp and/or hash of the one or more slices. In certain embodiments, a thread may allocate a data page D1 to store raw data. In some embodiments, a thread may scan each entry in the slice. In these embodiments, for each entry, the thread may store its address and contents within data page D1. If all entries have been scanned and data page D1 is not full, a thread may calculate the hash signature of D1, output the result, and stop. Otherwise, if D1 is full and the scan has not finished, the thread calculates the hash signature of data page D1, allocates a new page D2, stores the result of the calculation in D2, erase D1, and continue with the scan. In most embodiments, a thread may continue scanning until all entries are scanned, adding new entries in to D2 whenever D1 is filled or until the scan is finished, whichever comes first. In various embodiments, if D2 fills, a similar recursive algorithm may be applied to allocate a data page D3, store in D3 the hash signature of D2, and continue as before. If D3 fills up, a D4 page may be allocated. In most embodiments, more data pages may be created as needed. In various embodiments, at the end of the scan, the thread may compute a hash signature of all the Data Pages. In most embodiments, a thread may start by creating a hash of the first data page (D1) and placing it on the second page (D2), then creating a hash of D2 and placing it on the data page of D3 until all hashes may be contained within a single data page. In various embodiments, a thread may create a hash of the highest ranking data page (Dn) and output the results.

In most embodiments, each subsequent data page Dn page may correspond to exponentially more pages, and hence the process may not need a large number of pages. For example, in one embodiment, if a D1 page has room for 1024 entries (8 bytes each), a slice that has more than 1024 entries may require allocating a D2 page. In this embodiment, having a D2 page with room for 50 entries (assuming a hash signature is 20 bytes) may allow for 50*1024=50K entries in the slice. If the slice has more than 50K entries, a D3 page may allow up to 50*50K=2.5M entries, a D4 page may allow up to 125M entries, etc. In many embodiments, with a D4 (or 4 pages total) up to 125M entries may be accommodated, corresponding to 125M pages of data or 125M*8 KB=1 TB volume. In various embodiments, a data page D5 may allow up to 50 TB volumes. In these embodiments, the power of logarithmic reduction may enable minimization of memory requirements of the calculation. In most embodiments, the result of processing of slices may be independent of the distribution of slices within a system, which means that two different clusters with different A2C (Address to Control Module) tables will reach the same result.

In various embodiments, a data storage system may be enabled to further divide and conquer volume address space to sub-volumes based on higher address bytes and may be enabled to achieve finer than the 1024 slice granularity. In certain embodiments, multiple worker threads in a single control module may be enabled to calculate hashes of sub-volumes for the same slice, in parallel. In some embodiments, as long as all systems agree on the method to divide a slice to sub-slices, they will come up with the same signature for the slice and hence the same cryptographic stamp for the entire volume. In most embodiments, creating hashes of hashes in a hierarchical fashion to product a signature for a set of data may enable the data storage system to increase parallelism and performance. In various embodiments, as more hashes may be calculated independently and in parallel, performance of the calculation of a cryptographic stamp of a distributed data set within a data storage system may improve.

In most embodiments, slices may be distributed in the system based on the 8 low bits of an address (0-7) such that all addresses where the least significant byte has value X (where X is between 0 and 255) belong to slice number X where it may be guaranteed that a single processor manages slice X. In various embodiments, other address-based algorithms may be used to divide the entire address space into an arbitrary number of slices, where each slice is completely managed by a single processor. In most embodiments, changes to the algorithm may enable each processor to work on its own slices. In many embodiments, replication management may be enabled to assemble signatures from all slices and combine them into a single signature.

In yet another embodiment, a signature may be computed for the difference between two point in time snapshots S1 and S2. In these embodiments, each control module may be enabled to calculate a hash signature that describes data differences between two snapshots. In some embodiments, to achieve this, a control module may select a slice, and traverses in order all the addresses in the slice. In these embodiments, for each address X, if the hash of this address in a source site is different from the hash of this address in a target site, the hash of the target site may be added into the computation together with the address. In many embodiments, if an address has a hash on a target site but not in the source site, the address may be added to the computation. In various embodiments, if the hashes are the same or if both are non-existent, they may be skipped during the calculation of the cryptographic stamp.

Figure 2:
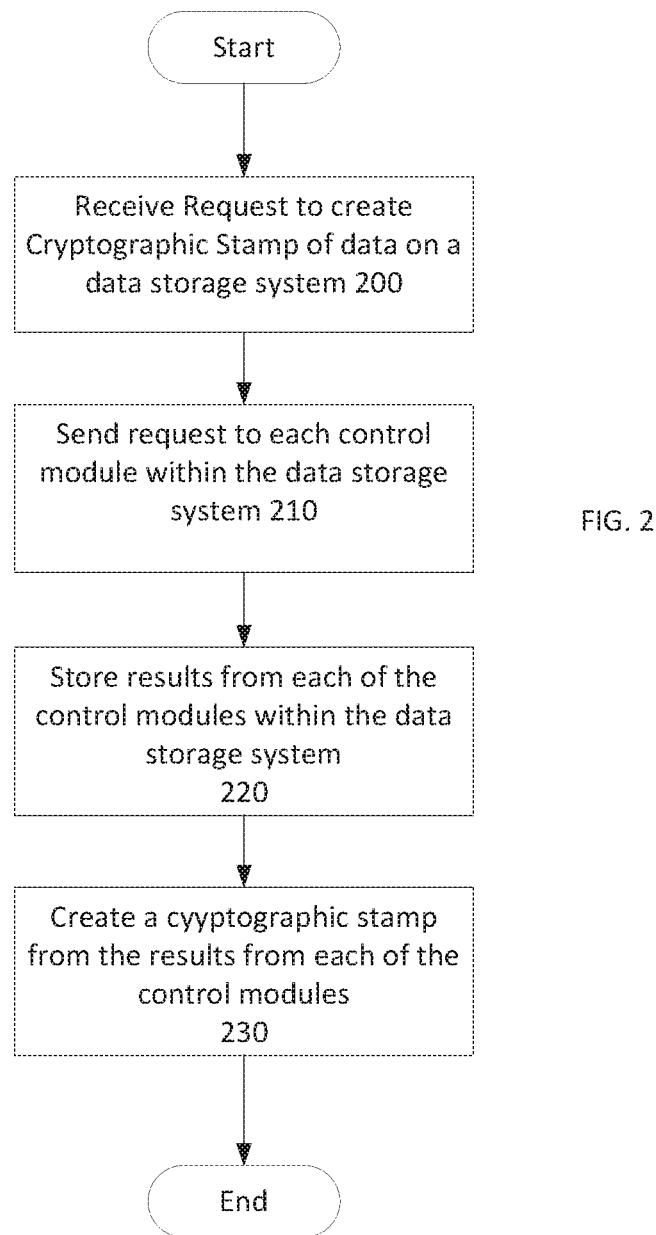
FIG. 2 is a simplified flowchart of a method of creating a layout independent cryptographic stamp using the data storage system described in FIG. 1, in accordance with an embodiment of the present disclosure.

Refer to the example embodiment of FIGS. 1 and 2. FIG. 2 is a simplified flowchart of a method of creating a layout independent cryptographic stamp using the data storage system described in FIG. 1, in accordance with an embodiment of the present disclosure. Data storage system 100 includes replication management 102, content addressable storage (CAS) system 104. In this embodiment, data storage system 100 receives a request to create a cryptographic stamp of data stored on the data storage system 100 (Step 200). Replication management 102 sends a request to each control module within the data storage system 100 (Step 210). As shown, control module 107 and control module 122 manage data I/Os within CAS 104. Replication management 102 sends a request to control module 107 to create a cryptographic stamp on each slice of the distributed data set managed by control module 107. Replication management 102 sends a request to control module 122 to create a cryptographic stamp on each slice of the distributed data set managed by control module 122. Replication management 102 stores the results received from control module 107 and control module 122 (Step 220). Replication management 102 creates a cryptographic stamp from the results received from control module 107 and control module 122 (Step 230), thereby creating a single cryptographic stamp.

Figure 3:
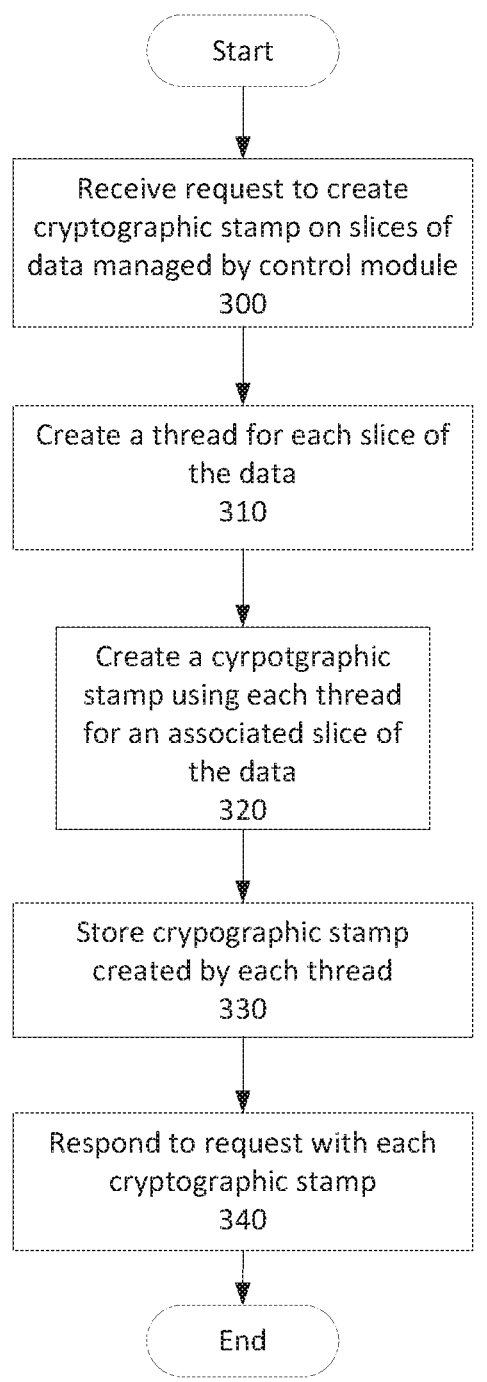
FIG. 3 is a simplified flowchart of a method of managing a request made to a control module to create cryptographic stamps on each slice stored within a control module in a data storage system as shown in FIG. 1, in accordance with an embodiment of the present disclosure.

Refer to the example embodiments of FIGS. 1 and 3. FIG. 3 is a simplified flowchart of a method of managing a request made to a control module to create cryptographic stamps on each slice stored within a control module in a data storage system as shown in FIG. 1, in accordance with an embodiment of the present disclosure. Data storage system 100 includes replication management 102, content addressable storage (CAS) system 104. In this embodiment, control modules 107, 122 receive a request from replication management 102 to create cryptographic stamps on slices of data managed by control modules 107, 122 (Step 300). Each control module 107, 122 creates a thread for each slice of data managed by each control module 107, 122 (Step 310). In many embodiments, the number of slices managed by a control module may differ depending on how a data set may be distributed. In some embodiments, a data set may include 1024 slices. In other embodiments, a data set may be divided into another amount of slice. In most embodiments, the slices may be evenly distributed to be managed by each of the control modules throughout a content addressable system. Control modules 107, 122 use a thread per slice to create a cryptographic stamp (Step 320). Control modules 107, 122 store the cryptographic stamps created by each thread (Step 330) and respond to the request with each cryptographic stamp created (Step 340). In most embodiments, a control module may control a portion of total slices of a data set stored within a content addressable storage system. In various embodiments, a control module may create a thread for each slice managed by the control module. In certain embodiments, a control module may receive a cryptographic stamp from each thread for each slice managed by the control module. In many embodiments, a control module may respond to a replication management module request with each cryptographic stamp created.

Figure 4:
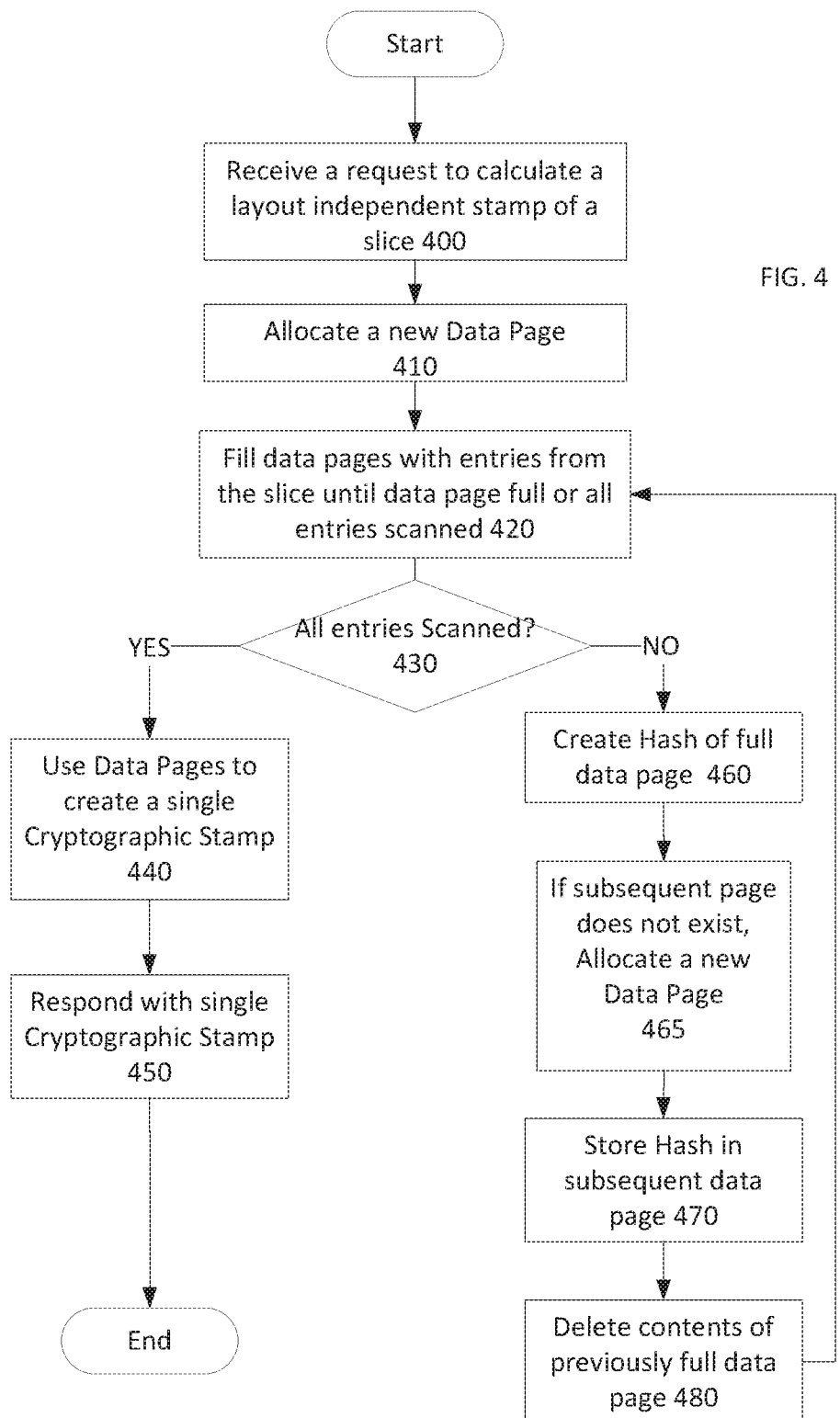
FIG. 4 is a simplified flowchart of a method of processing a single slice of a distribute data set within a data storage system as shown in FIG. 1, in accordance with an embodiment of the present disclosure.

Refer to the example embodiments of FIGS. 1 and 4. FIG. 4 is a simplified flowchart of a method of processing a single slice of a distribute data set within a data storage system as shown in FIG. 1, in accordance with an embodiment of the present disclosure. Data storage system 100 includes replication management 102, content addressable storage (CAS) system 104. In this embodiment, replication management 102 tasks control module 107 to create a cryptographic stamp for a specific slice of a distributed data set within the data storage system 100. In many embodiments, a control module may be responsible for multiple slices of a distributed data set and may be tasked with creating a cryptographic stamp for multiple slices of a distributed data set. In some embodiments, a control module may create one or multiple threads to manage creating a layout-independent cryptographic stamp for each slice managed by the control module. In certain embodiments, a control module may process a task in serial and/or in parallel.

In this embodiment, Control module 107 receives a request to calculate a layout independent cryptographic stamp of a specific slice of a distribute data set (Step 400). Control module 107 allocates a new data page (Step 410) as a work buffer to process the specific slice of the distributed data set. In most embodiments, a control module may create one or more data pages to process data and create one or more cryptographic stamps. In most embodiments, a slice may be include one or multiple entries which comprise the slice. Control module 107 fills the data page with entries from the slice until the data page is full or all entries have been scanned (Step 420). If the data page becomes full (Step 430), control module 107 creates a hash of the full data page (Step 460). If a subsequent data page (to the full data page) exists, the control module 107 allocates a new data page (Step 465). The control module 107 then stores the newly created hash in the subsequent data page (Step 470) and deletes the contents of the previously full data page (Step 480). Then the control module 107 repeats goes to Step 420 continues to fill the data pages with entries of the slice until any of the data pages are full or all entries are scanned (Step 420). If all entries are scanned (Step 430), the control module 107 uses the allocated data pages to create a single cryptographic stamp (Stamp 440) and responds to the initial request with a single cryptographic stamp (Step 450).

Figure 5C:
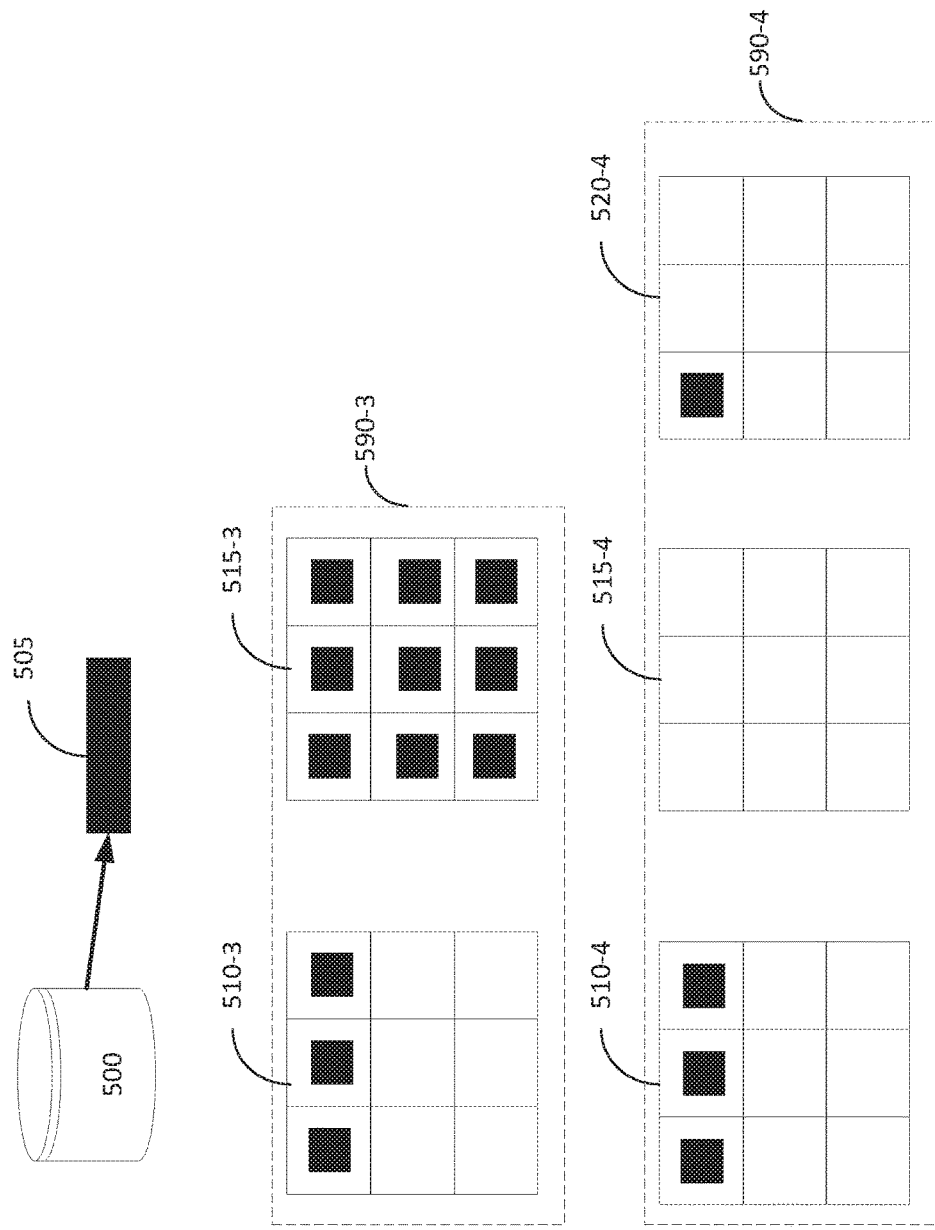

Refer to the example embodiments of FIGS. 5A-5C. FIGS. 5A-5C show simplified state diagrams of a thread in a control module within a data storage system processing a slice of a distributed dataset, in accordance with an embodiment of the present disclosure. FIG. 5A shows a first state of a thread in a control module processing a slice 505 of a distributed dataset 500. Data page 510-0 is shown with a size of 9 for simplicity. As shown, a thread in a control module is analyzing entries within slice 505 and placing those entries in data page 510-0. In this state, data page includes five entries.

FIG. 5B shows a second and third state of processing a slice 505 of a distributed dataset 500. In the second state 590-1, data page 510-1 is full and data page 515-1 is created. In the third state 590-2, the data from data page 510-1 is hashed and placed in data page 515-2 and entries within data page 510-2 are deleted.

FIG. 5C shows a fourth and fifth state of processing a slice 505 of a distributed dataset 500. In the fourth state 590-3, processing entries of slice 505 have progressed and data page 510-3 contains three entries and data page 515-3 includes nine entries and is full. In the fifth state 590-4, data page 520-4 is created and entries from data page 515-3 have been hashed and placed in data page 520-4. After, entries from data page 515-3 are deleted, which is shown in data page 515-4.

Figure 6:
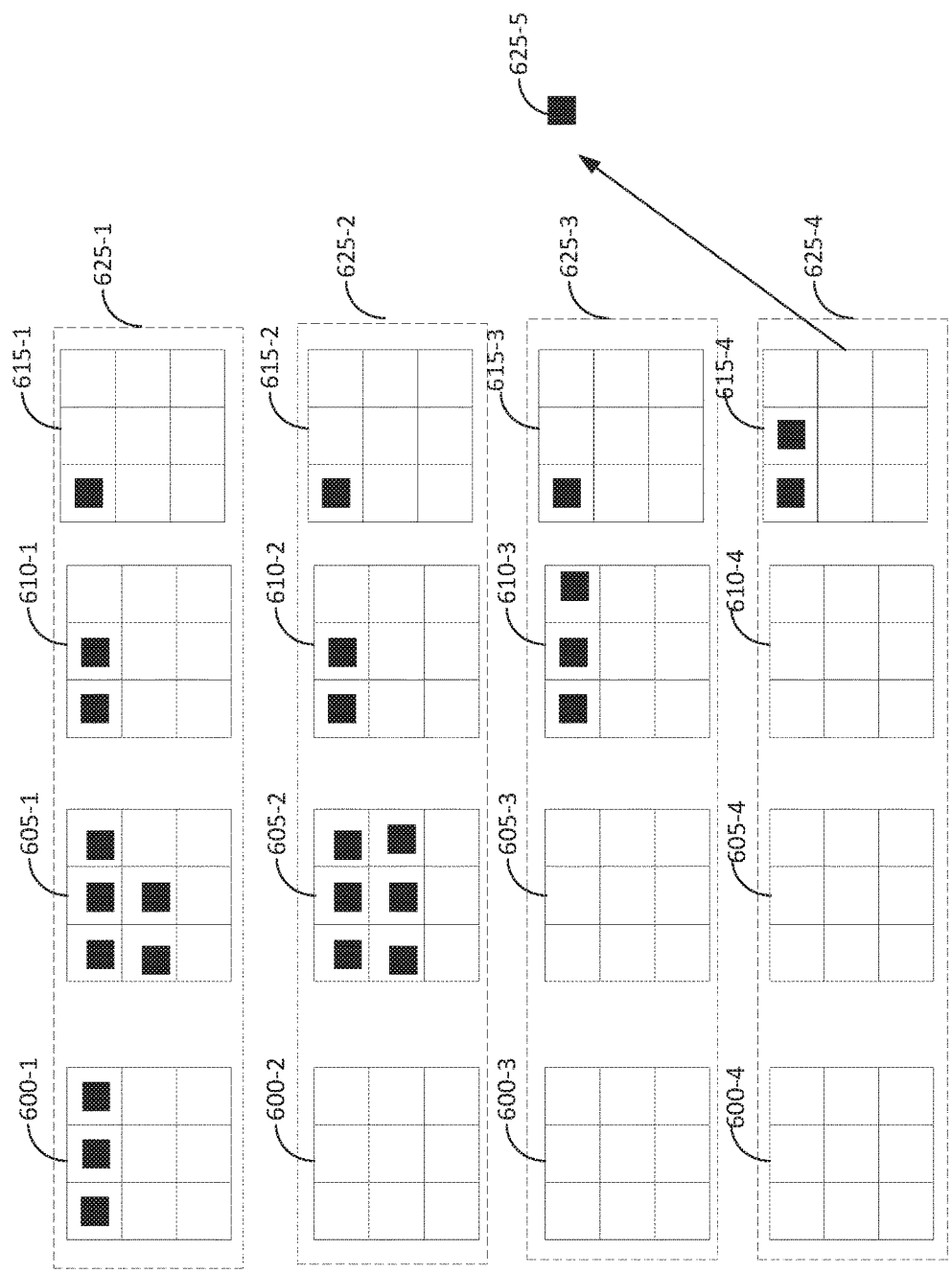
FIG. 6 is a simplified illustration of a control module processing a single slice of a distributed dataset stored within a data storage system, in accordance with an embodiment of the present disclosure.

Refer to the example embodiment of FIG. 6. FIG. 6 is a simplified illustration of a control module processing a single slice of a distributed dataset stored within a data storage system, in accordance with an embodiment of the present disclosure. In FIG. 6, four states are shown during processing of a single slice of a distributed dataset. Specifically, after completion of scanning each entry within a slice, a thread within a control module is at a first state 625-1 which includes data page 600-1, data page 605-1, data page 610-1, and data page 615-1. As shown, data page 600-1 includes three entries, Data page 605-1 includes five entries, data page 610-1 includes two entries, and data page 615-1 includes one entry. In this embodiment, once processing to create a layout-independent cryptographic stamp has arrived at first state 625-1, there are four steps (also four states) until a cryptographic stamp has been created. At state two 625-2, data from 600-1 is hashed and placed in data page 605-2. At state three 625-3, data from 605-2 is hashed and placed in data page 610-3 At state four 625-4, data from 610-3 is hashed and placed in data page 615-4. Finally, data from data page 615-4 is hashed to create cryptographic stamp 625-5 of a slice of a distributed data set.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
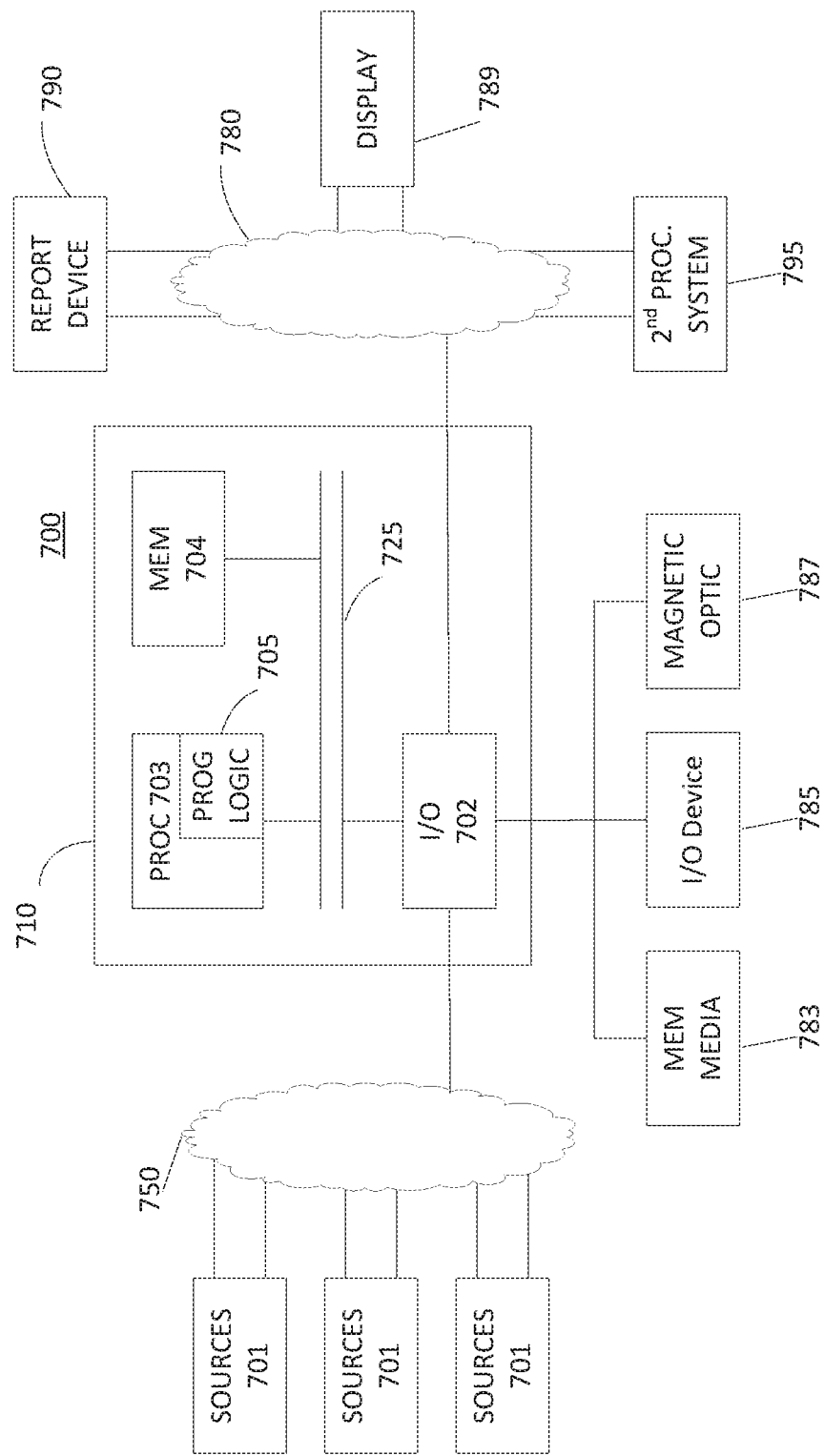
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic drives, optical drives, or Solid State Drives (SSD). When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
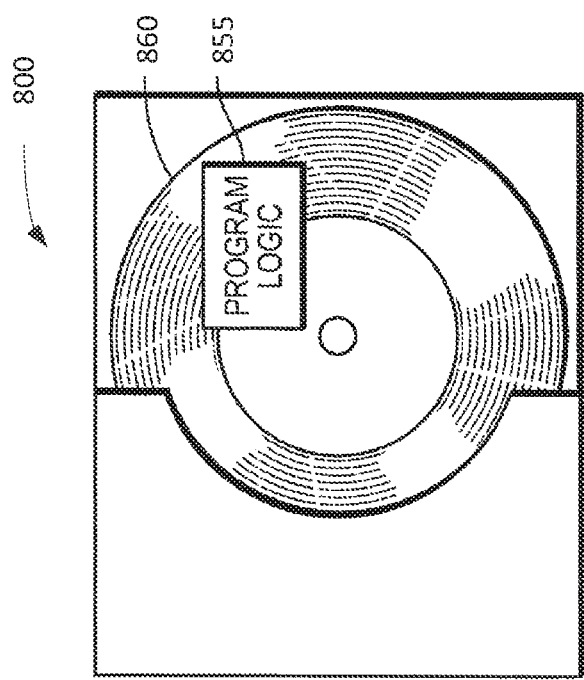
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of providing a layout-independent cryptographic stamp of a distributed data set from a data storage system, the computer-executable method comprising:
   receiving a request for a cryptographic stamp of the distributed data set;
   creating a hash of each slice of the distributed data set; and
   using each hash from each slice of the distribute data set to create the cryptographic stamp of the distributed data set, wherein the cryptographic stamp of the distributed data set is layout-independent of the data storage system.

2. The computer-executable method of claim 1, wherein the creating comprises: tasking a control module within the data storage system to create a hash for each slice managed by the control module; responding with a set of hashes created by the control module.

3. The computer-executable method of claim 2, wherein tasking comprises:
   creating a thread to process a slice of the distributed data set.

4. The computer-executable method of claim 3, further comprising:
   allocating a first data page;
   scanning entries within the slice;
   storing the entries within the first data page; and
   determining whether the data page is full.

5. The computer-executable method of claim 4, further comprising:
   upon a positive determination, allocating a new data page;
   creating a first hash of the first data page;
   storing the first hash in the new data page; and
   deleting all entries from the first data page.

6. The computer-executable method of claim 5, further comprising:
   resuming scanning entries within the slice until the first data page is full.

7. A system, comprising:
   a data storage system enabled to store a distributed data set; and
   computer-executable program logic encoded in memory of one or more computers enabled to provide a layout-independent cryptographic stamp of a distributed data set, wherein the computer-executable program logic when executed is configured for:
   receiving a request for a cryptographic stamp of the distributed data set;
   creating a hash of each slice of the distributed data set; and
   using each hash from each slice of the distribute data set to create the cryptographic stamp of the distributed data set, wherein the cryptographic stamp of the distributed data set is layout-independent of the data storage system.

8. The system of claim 7, wherein the creating comprises:
   tasking a control module within the data storage system to create a hash for each slice managed by the control module; and
   responding with a set of hashes created by the control module.

9. The system of claim 8, further including, wherein tasking comprises:
   creating a thread to process a slice of the distributed data set.

10. The system of claim 9, wherein the computer-executable program logic is further configured for:
    allocating a first data page;
    scanning entries within the slice;
    storing the entries within the first data page; and
    determining whether the first data page is full.

11. The system of claim 10, wherein the computer-executable program logic is further configured for:
    upon a positive determination, allocating a new data page;
    creating a first hash of the first data page;
    storing the first hash in the new data page; and
    deleting all entries from the first data page.

12. The system of claim 11, wherein the computer-executable program logic is further configured for:
    resuming scanning entries within the slice until the first data page is full.

13. A computer program product for providing a layout-independent cryptographic stamp of a distributed data set from a data storage system, the computer program product comprising:
    a non-transitory computer readable medium encoded with computer-executable code, the computer-executable code when executed configured for:
    receiving a request for a cryptographic stamp of the distributed data set;
    creating a hash of each slice of the distributed data set; and
    using each hash from each slice of the distribute data set to create the cryptographic stamp of the distributed data set, wherein the cryptographic stamp of the distributed data set is layout-independent of the data storage system.

14. The computer program product of claim 13, wherein the creating comprises:
    tasking a control module within the data storage system to create a hash for each slice managed by the control module; and responding with a set of hashes created by the control module.

15. The computer program product of claim 14, wherein tasking comprises:
   creating a thread to process a slice of the distributed data set.

16. The computer program product of claim 15, wherein the computer-executable code is further configured for the execution of:
   allocating a first data page;
   scanning entries within the slice;
   storing the entries within the first page; and
   determining whether the first data page is full.

17. The computer program product of claim 16, wherein the computer-executable code is further configured for the execution of:
   upon a positive determination, allocating a new data page;
   creating a first hash of the first data page;
   storing the first hash in the new data page; and
   deleting all entries from the first data page.

18. The computer program product of claim 17, wherein the computer-executable code is further configured for the execution of:
   resuming scanning entries within the slice until the first data page is full.

\* \* \* \* \*